United States Patent [19]

Adam

[11] Patent Number: 5,753,290

[45] Date of Patent: May 19, 1998

[54] PROCESSED MEAT AND POULTRY ENCASED IN NATURAL RUBBER THREAD WITH LOW NITROSAMINE

[75] Inventor: Roger M. Adam, New Bedford, Mass.

[73] Assignee: Globe Manufacturing Co., Fall River, Mass.

[21] Appl. No.: 701,128

[22] Filed: Aug. 21, 1996

Related U.S. Application Data

[60] Provisional application No. 60/002,745 Aug. 24, 1995.

[63] Continuation-in-part of Ser. No. 693,534, Aug. 8, 1996, abandoned.

[51] Int. Cl.$^6$ .................................................... A23L 1/01

[52] U.S. Cl. .................... 426/412; 426/105; 426/106; 426/113; 426/129; 426/232; 426/392; 426/410; 426/415; 426/523; 426/420

[58] Field of Search ............................. 426/105, 106, 426/113, 129, 232, 247, 392, 410, 412, 415, 523, 420

[56] References Cited

U.S. PATENT DOCUMENTS

| | | | |
|---|---|---|---|
| 3,956,217 | 5/1976 | Gazeley | 260/29.7 |
| 4,062,906 | 12/1977 | Knight | 260/739 |
| 4,110,500 | 8/1978 | Evans | 428/35 |
| 4,112,158 | 9/1978 | Creekmore | 428/35 |
| 4,231,912 | 11/1980 | Cowx | 260/29.7 |
| 4,729,410 | 3/1988 | Inagaki | 138/118.1 |
| 4,897,274 | 1/1990 | Candida | 426/127 |
| 5,112,674 | 5/1992 | German | 428/126 |
| 5,413,148 | 5/1995 | Mintz | 138/118.1 |
| 5,523,136 | 6/1996 | Fischer | 428/35.2 |
| 5,554,699 | 9/1996 | Layer | 525/332.7 |

FOREIGN PATENT DOCUMENTS

| | | |
|---|---|---|
| 0 591 632 A2 | 4/1994 | European Pat. Off. . |
| 5-186640 | 7/1993 | Japan . |

OTHER PUBLICATIONS

Sen et al., "Volatile Nitrosamines in Cure Meats Packaged in Elastic Rubber Nettings", J. Agric. Food Chem., 35(3), pp. 346–350, 1987.

Pensabene et al., "Solid–Phase Extraction Method for Volatile N–Nitrosamines in Hams Processed with Elastic Rubber Netting", Journal of AOAC International, 75(3), pp. 438–442, 1992.

Gorton et al., "Formulating natural rubber to meet regulatory nitrosamine limits", NR Technology, 18, Part 1, pp. 1–12, 1987.

Layer et al., "Minimizing Nitrosamines Using Sterically Hindered Thiuram Disulfides/Dithiocarbamates", Rubber Chem. Technol., 62(2), pp. 299–313, 1994.

Ferradino, A. G., "Economical Low Nitrosamine Ultra Accelerators", J. Adhes. Sealant Counc., vol. 1, pp. 69–81, Nov. 1996.

Trava-Sejdic et al., "Characterization of the Natural Rubber Vulcanizates Obtained by Different Accelerators", Eur. Polym. J., 32(12) pp. 1395–1401, 1996.

Brodsky, "Mixed Peroxide–Sulfur Curing System for Rubbers", Presented at the ACS Rubber Meeting, Orlando, FL, Oct. 26–29, 1993, Paper No. 126, pp. 1–28.

Fiddler et al., "Nitrosodibenzylamine in Boneless Hams Processed in Elastic Rubber Nettings", Journal of AOAC International, vol. 80, No. 2, 1977, pp. 353–358.

Verhelst et al., "Nitrosamines—From Problem to Challenge", Presented at the ACS Rubber Meeting, Orlando, FL, Oct. 26–29, 1993, Paper No. 124.

Graf, "Some forgotten Accelerators: the Thiophosphates— helpful in the . . . Accelerator Systems", Presented at the ACS Rubber Meeting, Orlando, FL, Oct. 26–29, 1993, Paper No. 125.

Kadir, "Advances in Natural Rubber Production", Rubber Chemistry and Technology, Presented at the ACS Rubber Meeting, Orlando, FL, Oct. 26–29, 1993, Paper No. 102.

Graf, "Realistic Strategies to Prevent Carcinogenic N–Nitrosamines in Rubber", Presented at the ACS Rubber Meeting, Orlando, FL, Oct. 26–29, 1993, Paper No. 19.

Loadman, "Nitrosamines; Myths, Fantasy and Facts", Presented at the ACS Rubber Meeting, Orlando, FL, Oct. 26–29, 1993, Paper No. 16.

Herrmann, "Formation of Nitrosamines in Air and in Rubber Mixtures", Presented at the ACS Rubber Meeting, Orlando, FL, Oct. 26–29, 1993, Paper No. 15.

Lloyd, "Recent Developments in Curing Systems for Natural Rubber", Presented at the ACS Rubber Meeting, Orlando, FL, Oct. 26–29, 1993, Paper No. 106.

Layer, "Minimizing Nitrosamines Using . . . Disulfides/ Dithiocarbamates", Presented at the ACS Rubber Meeting, Orlando, FL, Oct. 26–29, 1993, Paper No. 18.

Chaser, "Factors Affecting Nitrosamine Formation During Rubber Vulcanization", Presented at the ACS Rubber Meeting, Orlando, FL, Oct. 26–29, 1993, Paper No. 17.

"New Ham Process Raises Safety Concerns; Industry Study Planned", Food Chemical News (May 21, 1990).

"USDA to Ban Some Elastic Netting in Meat and Poultry Processing", USDA News, Jul. 27, 1990.

"USDA to Ban Rubber Nettings on Ham, Start Nitrosamine Monitoring", Food Chemical News, Jul 30, 1990.

"Legality, Justification of USDA Ham Netting Ban Challenged", Food Chemical News, Aug. 6, 1990.

"Temporary Restraining Order Against USDA Ham Netting Ban Sought", Food Chemical News, Aug. 13, 1990.

"USDA Ban on Meat Netting Blocked by Court: Second Firm Sues", Food Chemical News, Aug. 20, 1990.

"Restraining Order Against USDA Ham Net Ban Extended", Food Chemical News, Aug. 27, 1990.

(List continued on next page.)

Primary Examiner—Milton Cano
Attorney, Agent, or Firm—Pillsbury Madison & Sutro LLP

[57] ABSTRACT

The present invention provides rubber articles for single or multiple use food contact which, when used in smoking, curing or cooking meat or poultry, produce a low level of nitrosoamines or nitrosatable amines in the meat or poultry product.

8 Claims, No Drawings

OTHER PUBLICATIONS

"USDA Ordered to Hold Hearing Before Banning Elastic Nets", *Food Chemical News*, Sep. 3, 1990.

"FSIS to Begin Nitrosamine Monitoring of Hams", *Food Chemical News*, Sep. 10, 1990.

"Ham Netting", *Food Chemical News*, Sep. 17, 1990.

"Ham Nitrosamine", *Food Chemical News*, Sep. 24, 1990.

"Ham Netting", *Food Chemical News*, Oct. 15, 1990.

"Ham Nitrosamine", *Food Chemical News*, Nov. 19, 1990.

"USDA Rubber Net Manufacturers Settle Food Additive Suit", *Food Chemical News*, Dec. 3, 1990.

"FSIS Sampling Small Number of Netted Hams for Nitrosamines", *Food Chemical News*, Jan. 14, 1991.

"Up to 123 p.p.b. Found in Surface Samples", *Food Chemical News*, Feb. 25, 1991.

"USDA Plans Monitoring Program Based on Nitrosamine Findings", *Food Chemical News*, Feb. 25, 1991.

"Alternative Process Provision Will Minimize Impact, Norcross Says", *Food Chemical News*, Feb. 25, 1991.

"USDA OKs Undeclared Trimmings in Ham, Beef, Poultry", *Food Chemical News*, Feb. 25, 1991.

"USDA Ham Nitrosamine Monitoring Delayed Pending Rulemaking", *Food Chemical News*, Mar. 4, 1991.

"Ham Nitrosamine Monitoring to be Announced, Not Proposed ", *Food Chemical News*, Apr. 8, 1991.

"Industry Proposes Its Own Ham Nitrosamine Survey to USDA", *Food Chemical News*, Apr. 15, 1991.

"Nitrite Exposure From Foods on the Decline: Hotchkiss", *Food Chemical News*, Aug. 26, 1991.

"Suspect Use of Old Nitrosamine–Producing Ham Nets Reported", *Food Chemical News*, Sep. 2, 1991.

FDA Notice, Haveafil Sendirian Berhad, Filing of Food Additive Petition (Sep. 11, 1991) 56 FR 46324.

"FSIS Agrees to Continue Delaying Ham Nitrosamine Monitoring", *Food Chemical News*, Nov. 4, 1991.

"Petition to Clear Ham Netting Material Filed by Industry", *Food Chemical News*, Feb. 17, 1992.

FDA Notice, American Meat Institute, Filing of Food Additive Petition (Apr. 3, 1992) 57 FR 11485.

"Ham Netting Survey May be Undertaken by USDA, Norcross Says", *Food Chemical News*, Mar. 2, 1992.

"Meat, Poultry Netting Material Petition Filed", *Food Chemical News*, Apr. 6, 1992.

"Ham Netting Order may Resemble Rubber Articles Order", *Food Chemical News*, Jul. 6, 1992.

PROCESSED MEAT AND POULTRY ENCASED IN NATURAL RUBBER THREAD WITH LOW NITROSAMINE

This application is a continuation-in-part of U.S. application Ser. No. 08/693,534, filed on Aug. 8, 1996, now abandoned which claims the benefit of U.S. Provisional Application No. 60/002,745 filed on Aug. 24, 1995, the entire contents of which applications are incorporated by reference and to which priority is claimed.

The present invention provides a rubber thread containing low levels of nitrosatable amines, an elastic netting made from the thread and processes of cooking and curing meats encased by the elastic netting.

BACKGROUND OF THE INVENTION

Natural rubber thread has been used in elastic netting for the packaging of cooked or smoke cured meat and poultry products for many years. However, certain ingredients used in rubber thread formulation such as dithiocarbonate accelerators (vulcanization agents) are believed to react with nitrites present in the meat to produce unacceptable levels of potentially harmful nitrosamine compounds.

These nitrosamine compounds, which are regarded as carcinogenic, have been found to be present on the surface of meat, such as hams, processed with elastic netting, at levels of up to 50 parts per billion (ppb). Moreover, tested hams contained more than 10 ppb nitrosamine compounds in cross-sectional samples.

The Food and Drug Administration (FDA) and the U.S. Department of Agriculture (USDA) attempted to discontinue the use of commercially available elastic netting in 1990 for processing of cooked or smoked cured meat and poultry products after the Agency found unusually high levels of dibutylnitrosamine in cured hams processed in elastic netting. The Agency asserted that continued use of the rubber elastic netting would be considered violative of the food additive regulations. (Food Chemical News, Vol. 32, No. 22 "USDA to Ban Rubber Nettings on Hams, Start Nitrosamine Monitoring"; and Food Chemical News, Vol. 32, No. 23, "Legality, Justification of USDA Ham Netting Ban Challenged.")

It was stated to be the Agency's belief that the dibutylnitrosamine levels were the result of the reaction of an accelerator migrating from the rubber component of the netting reacting with the nitrite present in the hams.

A temporary restraining order issued Aug. 10, 1990, prohibited the USDA from pursuing further regulatory action regarding the use of an elasticized netting product of the C&K Manufacturing and Sales Company.

In attempting to determine base line levels in commercially available hams, field tests by the Food Safety and Inspection Service (FSIS) of the USDA of netted hams confirmed that nitrosamine levels varied widely, depending in part on whether surface or center cut slices were analyzed. The meat industry contended that center cut samples were more representative than surface samples of nitrosamines actually consumed. FSIS noted, however, that an increase in the size of the ham logically yielded lower DBNA levels in cross-section samples. Surface samples are expected to contain higher levels of nitrosamines or nitrosatable amines arising from the netting than center cut samples. The distinction is important because as part of the court settlement between the meat industry and the government, the USDA agreed to take regulatory action only on hams with 10 ppb or more of any nitrosamine in an average level in three center cut slices. (Food Chemical News, Vol. 32, No. 40).

The results reported by the USDA on samples of netted hams purchased at retail were as follows: cross-sections (including three duplicate samples) showed DBNA levels of non-detected (2 hams), 1 ppb, 5 ppb, 7 ppb (duplicate), 8 ppb (2 hams), 9 ppb, 11 ppb (duplicate), 12 ppb, 13 ppb (duplicate) and 19 ppb. Surface samples from the same hams showed DBNA levels respectively, of non-detectable (2 hams), 15 ppb, 18 ppb, 57 ppb, 24 ppb, 123 ppb, 60 ppb, 114 ppb, 68 ppb, 83 ppb and 51 ppb. Nitrosopiperidine was detected in surface samples of the one ham that showed 114 and 123 ppb DBNA in duplicate surface samples. No confirmable nitrosamines were found in cross-section or surface samples of 2 hams processed without netting or 3 hams processed in non-elastic netting. (Food Chemical News, Vol. 32, No. 52 "Up to 123 P.P.B. Found in Surface Samples.")

In response to the Agency action, the American Meat Institute filed a Food Additive Petition proposing to amend the food additive regulations to provide for the safe use of natural rubber latex, ammonium caseinate, talc, an emulsion prepared from potassium hydroxide and oleic acid mixture, butylated reaction product of p-cresol and dicyclopentadiene, dipentamethylene, thiuram tetrasulfide, Kaolin, 2,2-methylene-bis(4-methyl-6-tert-butyl phenol), sodium salts of polymerized alkyl-aryl sulfonic acids, potassium oleate, sodium naphthalene-sulfonate polycondensate, sulfur, and zinc dibenzyl dithiocarbamate as components of single use rubber thread used in the processing and packaging of food, including meat and poultry. 57 FR 11485 (Friday, Apr. 3, 1992). Although reports of proposed regulations for ham nettings have been published in the trade literature (Food Chemical News, Vol. 34, No. 19, "Ham Netting Order May Resemble Rubber Articles Order"), to date, the FDA and USDA have allowed continued use of conventional formulations.

There is a need, therefore, for an elastic thread which provides low nitrosamine levels in smoked, cured or cooked meat encased by same.

One skilled in the art will appreciate that the polymer contained in natural rubber latex and certain other rubber latices can be cross-linked without prior coagulation as the product is, in effect, a latex of vulcanized rubber. Natural rubber latex is usually pre-vulcanized by heating with dispersions of sulfur and an accelerator, such as zinc diethyldithiocarbamate, to 50°–80° C. The reaction proceeds much more rapidly than the vulcanization of dry rubber at the same temperature with the same vulcanizing ingredients. Some non-rubber constituents of ammonia-preserved natural rubber latex also act as accelerators. Natural rubber latex can also be pre-vulcanized by heating with peroxides and by irradiation.

Latices frequently must be compounded before use and some compounding ingredients, such as stabilizers and thickeners, are used with all types of latex in diverse applications, as known in the art. Stabilizers are either surfactants or water soluble hydrocolloids. Latices may also be compounded with plasticizers, pigments, and fillers. Latices of rubbery polymers are often compounded with vulcanizing ingredients, as discussed above.

The most common vulcanizing agents for unsaturated hydrocarbon rubbery polymers is sulfur. Very fast accelerators, such as dialkyldithiocarbamates and metal alkylxanthates, may also be required. Rubber thread production by extrusion, coagulation and continuous curing of natural rubber latex compounds requires ultra fast curing accelerators in the compound. Thiazoles are sometimes used as secondary accelerators. A zinc source such as zinc oxide is often desirable; however, zinc is often available because the accelerators are frequently used in the form of their zinc salts or chelates.

For the reasons noted above, concentrations of nitrosamines and nitrosatable secondary amines in rubber latex products need to be kept to a minimum. The main sources of secondary amines, and hence of nitrosamines, in rubber latex products are thiuram and dithiocarbamate preservatives and diethiocarbamate (i.e., zinc dialkyldithiocarbamates or zinc dibenzyldithiocarbamate) accelerators. (*Encyclopedia of Polymer Science and Engineering*, Vol. 8, John Wiley & Sons, Inc., NY, N.Y. (1987) Blackley DC "Latices" pp. 647–677 ("Blackley").)

The dialkyldithiocarbamates and zinc dibenzyldithiocarbamate accelerators produce dialkylamines and dibenzylamines which are readily nitrosated in food processing operations, yielding objectionable levels of nitrosamines.

Recommendations for minimizing carcinogenic nitrosamines include the use of high-ammonia natural rubber latex concentrate or low-ammonia concentrates free of secondary preservatives which give rise to secondary amines; the use of dithiocarbamate accelerators of low water solubility such as zinc dibenzyldithiocarbamate, which liberate amines of high molecular weight and low volatility; and thorough leaching of the product (Blackley).

The present invention provides a rubber article, such as a thread, for use in elastic nettings for enclosing meat and poultry products, which overcomes the unacceptable levels of nitrosamines found when conventional dithiocarbamate accelerators have been used.

SUMMARY OF THE INVENTION

The present invention provides a rubber article which, when contacted with meat or poultry, produces lower levels of nitrosamines.

In one embodiment, the rubber article of the present invention is constructed of natural or synthetic rubber and may include any of the following elastomers: acrylonitrile-butadiene copolymer, brominated isobutylene-isoprene copolymers, butadiene-acrylonitrile-ethylene glycol dimethacrylate copolymers, butadiene-acrylonitrile-methacrylic acid copolymer, butadiene-styrene-methacrylic acid copolymer, chloroprene polymers, chlorotrifluoroethylene-vinylidene fluoride copolymer, ethylene-propylene copolymer elastomers, ethylene-propylene-dicyclopentadiene copolymer, ethylene-propylene-1,4-hexadiene copolymers, isobutylene-isoprene copolymer, polybutadiene, polyester elastomer derived from the reaction of dimethyl teraphthalate, 1,4-butanediol, and (alpha)-hydro-(v)-hydroxypoly(oxytetramethylene), polyisoprene, polyurethane, natural rubber, silicone basic polymer, styrene-butadiene copolymer, vinylidene fluoride-hexafluoropropylene copolymers, vinylidene fluoride-hexafluoropropylene-tetrafluoroethylene copolymers and any elastomer material described in Title 21 of the Code of Federal Regulations as acceptable for single or repeated food contact, such as described in particular at 21 CFR § 177.2600.

In another embodiment, the rubber article of the present invention is an elastomer which has been vulcanized with a vulcanization system containing zinc oxide, a fatty acid, sulfur, and an accelerator and/or ultra accelerator, but may also optionally include retarders, activators, antioxidants, antiozonants, plasticizers, fillers, lubricants, emulsifiers and other miscellaneous ingredients known in the art.

Preferred accelerators used in the present invention include zinc diisobutyldithiocarbamate and/or tetraisobutyl thiuram disulfide. The accelerators useful in the present invention do not include zinc dibenzyldithiocarbamate, zinc dibutyldithiocarbamate, zinc diethyldithiocarbamate or zinc dimethyldithiocarbamate.

Retarders useful in the present invention, when present, include cyano guanidine, phthalic anhydride and/or salicylic acid.

Activators useful in the present invention, when present, include diethylamine, fatty acid amines, fatty acids, magnesium carbonate, magnesium oxide, dibutylammonium oleate, potassium oleate, stannous chloride, tall oil fatty acids, tetrachloro-p-benzoquinone, triethanolamine and/or zinc salts of fatty acids.

Antioxidants and antiozonates useful in the present invention, when present, include aldol-a-naphthylamine, butylated hydroxytoluene (BHT), 4-((4,6-bis(octylthio)-s-triazin-2-yl)amino)-2,6-di-tert-butylphenol, butylated reaction product of p-cresol and dicyclopentadiene, butylated octylated phenols, butylated/styrenated cresols, 4,4-butylidine bis(6-tert-butyl-m-cresol), N-cyclohexyl-N-phenylphenylene-diamine, p,p-diaminodiphenylmethane, 2,5-di-tert-amylhydroquinone, diaryl-p-phenylenediamine (aryl being, for example, phenyl, tolyl, or xylyl), 2,6-ditert-butyl-p-phenylphenol, 1,2-dihydro-2,2,4-trimethyl-6-dodecylquinoline, 1,2-dihydro-2,2,4-trimethyl-6-ethoxyquinoline, 1,2-dihydro-2,2,4-trimethyl-6-phenylquinoline, 4,4-dimethoxydiphenylamine, 4,6-dinonyl-o-cresol, N,N-diocty-p-phenylene diamine, diphenylamine-acetone resin, diphenylamine-acetone-formaldehyde resin, N,N-diphenylethylenediamine, N,N-disalicylal-propylene diamine, N,N-di-o-tolylethylenediamine, hydroquinone monobenzyl ether, isopropoxydiphenylamine, N-isopropyl-N-phenyl-p-phenylene diamine, 2,2-methylenebis(6-tert-butylphenol), 2,2-methylene-bis(4-methyl-6-nonylphenol), 2,2-methylenebis(4-methyl-6-tert-octylphenol), monoctyldiphenylamine, dioctyldiphenylamine, N,N-di-β-naphthyl-p-phenylenediamine, phenyl-α-naphthylamine, phenyl-β-naphthylamine, phenyl-β-naphthylamine-acetone aromatic amine, phenyl-β-naphthylamine-acetone aromatic amine resin, o-phenylphenol, p-phenylphenol, polybutylated 4,4-isopropylidenediphenol, sodium pentachlorophenate, stryenated cresols, stryenated phenol, 4,4-thiobis(6-tert-butyl-m-cresol), toluene-2,4-diamine, N-o-tolyl-N-phenyl-p-phenylene diamine, p(p-tolylsulfanilamide) diphenylamine, tri(mixed mono-and dinonylphenyl) phosphite and/or tri(nonylphenyl)phosphite-formaldehyde resins.

Plasticizers used in the rubber article of the present invention, when present, may include n-amyl n-decyl phthalate, butylacetyl ricinoleate, n-butylester of tall oil fatty acids, butyl laurate, butyl oleate butyl stearate, calcium stearate, castor oil, conmarone-indene resins, 2.2-dibenzamide-diphenyl disulfide, dibenzyl adipate, dibutoxyethoxyethyl adipate, dibutyl phthalate, dibutyl sebacate, didecyl adipate, didecyl phthalate, diisodecyl adipate, diisodecyl phthalate, diisooctyl adipate, diisooctyl sebacate, dioctyl adipate, dioctyl phthalate, dioctyl sebacate, dipentene resin, diphenyl ketone, fatty acids, hydrogenated fatty acids, isooctyl ester of tall oil fatty acids, lanolin, α-methylstyrene-vinyltoluene copolymer resins, mineral oil, montan wax, n-octyl n-decyl adipate, n-octyl n-decylphalate, petrolatum, petroleum hydrocarbon resin, hydrogenated petroleum hydrocarbon resin, sulfonated petroleum oil, phenol-formaldehyde resin, pine tar, polybutene, polystyrene, propylene glycol, n-propyl ester of tall oil fatty acids, rapeseed oil vulcanized with sulfur, rosins, soybean oil vulcanized with sulfur, styrene-acrylonitrile copolymer, terpene resins, triethylene glycol dicaprate, triethylene glycol dicaprylate, petroleum waxes, xylene alkylated with dicyclopentadiene, toluene alkylated with dicyclopentadiene, and/or zinc 2-benzamidothiophenate.

Fillers used in the rubber article of the present invention, when present, include aluminum hydroxide, aluminum silicate barium sulfate, carbon black, cork, cotton (floc, fibers or fabric), mica, nylon (floc, fibers or fabric), silica, titanium dioxide, zinc carbonate and/or zinc sulfide. Asbestos fiber (chrysotile or crocidotite) may be used as an approved filler however its use is unlikely due to negative public perception regarding asbestos.

Colorants useful in the rubber articles of the present invention, when present, include colorants used in accordance with 21 CFR § 178.297 or otherwise known in the art.

Lubricants useful in formulating the rubber article of the present invention, when present, include polyethylene and/or sodium stearate.

Emulsifiers useful in formulating the rubber article of the present invention include, when present, sodium or potassium fatty acid salts, naphthalene sulfonic acid-formaldehyde condensate (sodium salt), rosins, sodium decyl benzene sulfonate, sodium dodecylbenzene sulfonate, sodium lauryl sulfate, and/or tall oil mixed soap (calcium, potassium, and sodium).

Miscellaneous components which may be used in formulating the rubber article according to the present invention include: animal glue, azodicarbonamine, 2-anthraquinone sulfonic acid sodium salt, n-butylithium, 4-tert-butyl-o-thiocresol, tert-butylpyrocatechol, dialkyl ($C_1$–$C_{18}$) dimethylammonium chloride, di- and tri-ethanolamine, diethyl xanthogen disulfide, 4-(diidomethylsulfonyl)toluene, dodecylmercaptan isomers, 2-ethoxyethanol, iodoform, p-menthane hydroperoxide, α-(p-nonylphenyl)-omega-hydroxypoly(oxyethylene), mixture of dihydrogen phosphate and monohydrogen phosphate esters, 4,4-oxybis (benzenesulfonhydrazide), phenothiazine, potassium persulfate, sodium formaldehyde sulfoxylate, sodium polysulfide, sodium nitrite, sodium salt of ethylenediamine tetraacetic acid and glycine, sodium sulfide, styrene monomer, tall oil, thioxylenes, tridecyl mercaptan, and/or zinc-4-tert-butylthiophenate.

When used for food contact, the rubber article of the present invention is formulated to comply with all necessary regulatory requirements and the above components are included in a manner consistent with same, such as found, for example, in Title 21 of the CFR.

In one embodiment, the present invention provides a rubber article, such as meat or poultry netting, which has an average concentration of preformed nitrosamine of less than about 100 ppb, preferably less than about 70 ppb, more preferably less than about 35 ppb, most preferably less than about 10 ppb. More particularly, the present invention provides rubber article which has an average concentration of preformed levels of at least one of N-nitrosodiisobutylamine or N-nitrosodibenzylamine of less than about 100 ppb, preferably less than about 70 ppb, more preferably, less than about 35 ppb, most preferably less than about 10 ppb.

In another embodiment of the present invention, the rubber article is at least partially coated or covered by cotton, polyester, nylon, or the like, thread, in a manner known in the art and constructed and arranged as a netting used in producing smoked, cured or cooked meat or poultry.

It is a further object of the present invention to provide a method for producing smoked, cured or cooked meat or poultry which includes the steps of encasing or at least partially enclosing the meat or poultry in the rubber article of the present invention.

It is another object of the invention to provide a smoked, cured, or cooked meat or poultry product which contains a reduced nitrosamine concentration or level lower than currently available.

In one embodiment, the smoked, cured or cooked meat or poultry provided by the present invention contains a lower concentration of nitrosamines than meat or poultry smoked, cured or cooked in contact with a natural rubber article which has been vulcanized with at least one of tetramethylthiuram monosulfide, tetramethylthiuram disulfide, zinc diethyldithiocarbamate, and/or zinc dibenzyldithiocarbamate.

Preferably, the meat or poultry product produced by use of the present invention has an average outer surface concentration of preformed nitrosamine of less than about 100 ppb, preferably less than about 70 ppb, more preferably less than about 35 ppb, most preferably less than about 10 ppb. More particularly, the present invention provides a cooked, cured or smoked meat or poultry product which has an average outer surface concentration of at least one of N-nitrosodiisobutylamine or N-nitrosodibenzylamine of less than about 100 ppb, preferably less than about 70 ppb, more preferably less than about 35 ppb, most preferably less than about 10 ppb.

Additional objects and advantages of the invention will be set forth in part in the description that follows and in part will be obvious from the present description or may be learned from practice of the invention.

DETAILED DESCRIPTION OF THE INVENTION

The present invention provides rubber articles, such as rubber thread for single or multiple use in producing smoked, cured or cooked meat or poultry, as well as processes for producing the smoked, cured or cooked meat or poultry containing the rubber articles of the present invention and a smoked, cured or cooked meat or poultry product produced from the process of the invention. The present invention also provides a formulation for the rubber articles of the invention.

The present inventors have discovered that the use of certain specific accelerators or ultra-accelerators, in conventional rubber formulations advantageously and unexpectedly provides lower levels of nitrosamines and nitrosatable amines in the rubber articles produced from these formulations. More specifically, it has been discovered that rubber articles, such as rubber thread, and elastic nets produced therefrom, for food processing, such as smoking, curing or cooking meat or poultry, which have been produced with the use of the presently described accelerators yields low levels of nitrosamines and nitrosatable amines, in netting and in the meat or poultry product processed with same.

The present inventors have discovered that the use of zinc diisobutyldithiocarbamate and/or tetraisobutylthiuram disulfide as accelerators in otherwise conventional rubber formulations produce a rubber article as described above.

In a preferred embodiment, the rubber article of the present invention is an extruded natural rubber thread produced from creamed and centrifuged natural latex. As further detailed below, the accelerators described above were incorporated into the compound described below as a 50% aqueous dispersion, extruded into a coagulating bath containing 50% aqueous acetic acid and subjected to a series of hot water baths, prior to drying. The individually coagulated ends were passed through a talc through application, through a ribbon forming device and through heated areas to effect curing in a manner known in the art. In this embodiment, the ribbon consisted of a multiplicity of threads, perhaps 40, that are butted and lightly adhered edge to edge. As will be recognized by those skilled in the art, the ribbon is a convenient form to handle and ship rubber thread as well as for feeding through, for example, a comb-like device, to feed the separate threads into a machine for covering the rubber threads with cotton thread for production of elastic netting.

The following is a preferred formulation for the rubber thread of the invention (units are parts by weight per dry composition; dispersions and solutions contain noted component in water).

| | |
|---|---|
| natural rubber latex | 100.00 |
| potassium oleate soap (16% solution) | 0.30–1.25 |
| potassium hydroxide (20% solution) | 0.20–1.50 |
| Wingstay L antioxidant (butylated reaction product of p-cresol and dicyclopentadiene) (50% dispersion) | 1.00 |
| sulfur (50% dispersion) | 1.65 |
| aluminum silicate (clay) (60% dispersion) | 10.00 |
| zinc oxide (50% dispersion) | 1.25 |
| at least one of: | |
| zinc diiosbutyl-dithiocarbamate and/or | 00.0–1.00 |
| tetraisobutyl-thiuram disulfide (50% dispersion) | 0.00–1.00 |

Zinc di-isobutyldithiocarbamate and tetraisobutyl thiuram disulfide are available from R. T. Vanderbilt Company, Inc. Norwolk Conn., sold under the names ISOBUTYLZIMATE™ and ISOBUTYLTUADS, respectively.

In a preferred embodiment of the present invention, at least one of the following ingredients were used in the preparation of the dispersion and, accordingly, may be present to some degree in the final thread:

sodium salts of polymerized alkyl naphthalene sulfonate, potassium caseinate, sodium dioctyl sulfosuccinate, sodium o-phenyl phenate tetra hydrate, sodium polycarboxylate, bentonite clay, triethanol amine, and dimethylpolysiloxane.

In one embodiment, the presently disclosed extruded natural latex thread, was produced by blending creamed and centrifuged natural rubber latex followed by addition of potassium oleate soap and a potassium hydroxide solution. An antioxidant dispersion was then added, followed by addition of the sulfur dispersion and clay dispersion. This "base compound" was homogenized with additional water as known in the art. The base compound was transferred to a jacketed mix tank and heated to 90° F. while being agitated. Additional amounts of potassium oleate soap were added to further enhance stability followed by addition of the above described accelerators. The oxide was then added as a cure accelerator and additional water to a preferred viscosity to allow uniform extrusion. After sufficient pre-cure and partial cross-linking, the mixture was cooled to about 60° F. Extrusion and subsequent processing was completed as described above.

The following Examples illustrate the invention.

EXAMPLE 1

Natural rubber threads were made as described above in a manner known in the art, with the accelerator content shown in Table 1 below. All rubber formulations described herein contain 1.25 pph zinc oxide, unless indicated otherwise. In each case, a small sample of rubber thread (0.50 g) was removed and cut into little pieces. Dichloromethane (DCM) was added to each sample and left to soak for 18 hours. The samples were then filtered through anhydrous sodium sulfate, concentrated to 1.0 ml by an electrically heated water bath and quantitated on the gc-TEA (thermal energy analyzer which specifically measures nitroso compounds to less than nanogram levels). All samples were run against the all 10 standard plus N-nitrosodiisobutylamine (NDiBA) Samples were run in duplicate. Because N-nitroso dibenzylamine is semi- to non-volatile and does not elute off the GC with other nitrosamines, the GC was run under the following two conditions. A first chromatogram contains the all 10 components (all 10 standard) in the following elution order: N-nitroso-dimethylamine, -methylethylamine, -diethylamine, -dipropylamine, -azetidine, -dibutylamine, -piperidine, -pyrrolidine, -morpholine, and -hexamethyleneimine. A second chromatogram, run under different conditions, contains N-nitroso-dipropylamine, -diisobutylamine, -dibutylamine and -dibenzylamine. The peak size and shape makes it possible to quantitate less than 1 mg nitrosamine. Samples 1 and 2 were also run against an N-nitrosodibenzylamine (NDBzA) standard.

TABLE 1

| Sample No. | ppb NDiBA in rubber thread | ppb NDBzA in rubber thread | accelerator IBZ[1] | accelerator IBT[2] | ultra accelerator AZ[3] | ultra accelerator BN[4] |
|---|---|---|---|---|---|---|
| 1 | 76.0 | N.D. | — | — | 0.75 | 0.0665 |
| 2 | N.D. | N.D. | 0.0665 | — | 0.75 | — |
| 3 | 91.5 | — | 0.25 | — | — | — |
| 4 | 141.0 | — | 0.50 | — | — | — |
| 5 | 65.4 | — | 0.75 | — | — | — |
| 6 | 173.3 | — | — | 1.0 | — | — |
| 7 | 33.9 | — | — | 0.50 | — | — |
| 8 | 275.0 | — | 0.50 | 0.50 | — | — |
| 9 | 179.5 | — | 0.25 | 0.25 | — | — |

[1]IBZ = Zinc diisobutyldithiocarbamate
[2]IBT = tetraisobutylthiuram disulfide
[3]AZ = zinc dibenzyldithiocarbamate
[4]BN = sodium dibutyldithiocarbamate
N.D. = NOT DETECTABLE
— = not measured or not present
ppb = parts per billion
amounts of accelerator and ultra accelerator in dry parts per hundred dry rubber by weight

EXAMPLE 2

Nitrosation potential of samples 1, 2, 5 and 7 above were measured by the following method.

A small sample of the rubber thread (0.50 g) was removed from the samples and cut into small pieces. 0.2N HCl was added and the samples left to extract for 18 hours. The samples were filtered, then 1.0 g $NaNO_2$ was added over a one hour period at room temperature. Sulfamic acid was added after one hour to stop the nitrosation. The HCl was extracted with DCM, the DCM washed with 5N NaOH, dried and concentrated. The samples were quantitated on a gc-TEA against the above noted standards.

TABLE 2

| | Nitrosation Potential | |
|---|---|---|
| Sample No. | ppb NDiBA in thread | ppb NDBzA in thread |
| 1 | 4066 | 128,595 |
| 2 | 6832 | 74,594 |
| 5 | 1,122 | N.D. |
| 7 | 23,891 | N.D. |

EXAMPLE 3

Further samples of the above formulations were manufactured in a separate lot and tested with the resulting nitrosamine levels detailed below in Table 3 which were run against the all 10 standard plus NDiBA and NDBzA.

TABLE 3

| Sample No. | ppb NDiBA in thread | nitrosation potential ppb NDBzA | nitrosation potential ppbND:BA | accelerator IBZ | ultra accelerator AZ | ultra accelerator BN |
|---|---|---|---|---|---|---|
| 10 | N.D. | 36,221 | — | — | 0.75 | 0.0665 |
| 11 | N.D. | — | 2,442 | 0.75 | — | — |
| 12 | N.D. | — | 758 | 0.50 | — | — |
| 13 | N.D. | — | 716 | 0.25 | — | — |

EXAMPLE 4

Thread samples were prepared with 0.50 parts (dry) of zinc diisobutyldithiocarbamate per hundred parts (dry) of rubber and extruded as forty (40) end ribbon, and prepared into elastic ham netting by methods known in the art. The nettings were covered with cotton thread and used to process six (6) hams under commercial processing conditions. Testing of nitrosamines in the outer surface of the hams, and the nitrosamines levels of the rubber nettings after processing are shown below in Table 4. The cotton thread used to cover the rubber contained 3.7 ppm nitrite, calculated as sodium nitrite.

TABLE 4

| | Used Nettings | | Outer Ham Surface | |
|---|---|---|---|---|
| | Nitrosamines, ppb | | | |
| Sample No. | NDiBA | NDBzA | NDiBA | NDBzA |
| A | 8.7 | 19.5 | 4.6 | 2.3 |
| B | 9.6 | 22.0 | 5.8 | 2.3 |
| C | 7.4 | 20.3 | 4.1 | 2.1 |
| D | 12.2 | 23.7 | 6.7 | 2.8 |
| E | 6.5 | 23.7 | 5.1 | 2.7 |
| F | 8.7 | 20.3 | 6.2 | 2.5 |

EXAMPLE 5

The thread of EXAMPLE 4 was produced separately and tested as described above with the following results.

TABLE 5

| | Used Nettings | | Outer Ham Surface | |
|---|---|---|---|---|
| | Nitrosamines, ppb | | | |
| Sample No. | NDiBA | NDBzA | NDiBA | NDBzA |
| G | 22.2 | 33.0 | 7.3 | 1.8 |
| H | 31.5 | 24.6 | 9.7 | 2.6 |
| I | 17.1 | 29.1 | 6.6 | 2.5 |
| J | 24.1 | 31.0 | 5.7 | 1.5 |
| K | 27.8 | 19.8 | 10.2 | 2.7 |
| L | 22.2 | 27.0 | 10.6 | 1.6 |

EXAMPLE 6

Experiments were undertaken to evaluate the effect of various potassium hydroxide, potassium oleate and ammonium levels upon extrusion uniformity, as well as evaluate the reproducibility of a second production lot of zinc diisobutyldithiocarbamate. Tables 6A and 6B demonstrate the preformed and nitrosatable nitrosamines which were measured as described above.

TABLE 6A

| | Nitrosamines, of thread (ppb) | | | |
|---|---|---|---|---|
| | Preformed | | After Nitrosation | |
| Sample No. | NDiBA | NDBzA | NDiBA | NDBzA |
| 14 | N.D. | N.D. | 1794 | 177 |
| 15 | N.D. | N.D. | 5964 | 300 |
| 16 | N.D. | N.D. | 6255 | 615 |

TABLE 6B

| Sample No. | Ammonia (pph) | Potassium hydroxide (pph) | Pottassium Oleate (pph) | Zinc Diisobutyl- dithiocarbamate (pph) |
|---|---|---|---|---|
| 14 | 1.01 | 0.20 | 1.00 | 0.50 |
| 15 | 0.71 | 1.03 | 0.30 | 0.50 |
| 16 | 0.71 | 0.20 | 1.00 | 0.50 |

EXAMPLE 7

A further extrusion of the above samples 14–16 was conducted as samples 17–19, respectively, with the results shown in the following Table 7. Particular care was taken in preparing these samples to prevent contamination by other accelerators or ultraaccelerators.

TABLE 7

| | Nitrosamines, of thread (ppb) | | | |
|---|---|---|---|---|
| | Preformed | | After Nitrosation | |
| Sample No. | NDiBA | NDBzA | NDiBA | NDBzA |
| 17 | N.D. | N.D. | 4300 | N.D. |
| 18 | N.D. | N.D. | 5967 | N.D. |
| 19 | N.D. | N.D. | 2017 | N.D. |

EXAMPLE 8

Based on the results of Example 7, thread samples were prepared and made into elastic netting from the formulation of Sample No. 19, above. The nettings were used to process hams under commercial processing conditions, by a commercial processor. No detectable nitrosamines were found in the unused netting. The nitrosamine values for the used nettings as well as the outer ham surfaces are listed in the following Table 8. Nitrosamine values are included for a control sample using a commercial netting which was processed at the same time.

TABLE 8

| Sample No. | Used Nettings (ppb) | | Outer Ham Surface (ppb) | |
|---|---|---|---|---|
| | NDiBA | NDBzA | NDiBA | NDBzA |
| 20 | 37.1 | 36.4 | 8.8 | 3.6 |
| 21 | N.D. | 72.0 | 2.2 | 7.5 |
| 22 | N.D. | 68.0 | 2.5 | 9.3 |
| 23 | 25.8 | 40.2 | 7.5 | 6.7 |
| 24 | N.D. | 65.0 | 2.2 | 6.6 |
| Average | 12.5 | 56.3 | 4.6 | 6.7 |
| Control | N.D. | 276.0 | N.D. | 96.1 |

All publications hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the present invention and appended claims.

What is claimed is:

1. A method of processing meat or poultry to lower the nitrosamine content therein comprising:
at least one of smoking, curing or cooking meat or poultry encased in an elastic net wherein said elastic net comprises natural or synthetic rubber latex vulcanized with a vulcanizing system comprising at least one of zinc diisobutyldithiocarbamate and tetraisobutylthiuram disulfide which vulcanizing system functions to lower the nitrosamine content in said smoked, cured or cooked meat or poultry.

2. A method according to claim 1, wherein said rubber latex is natural rubber latex.

3. A method according to claim 1, wherein said vulcanizing system further comprises at least one of zinc oxide, a fatty acid and sulfur.

4. A method according to claim 1, wherein said elastic net further comprises cotton thread at least partially covering said rubber.

5. A method according to claim 1, wherein said meat or poultry product after said curing, smoking or cooking has an average outer surface preformed nitrosamine concentration of less than about 35 ppb.

6. A method according to claim 5, wherein the average outer surface preformed nitrosamine concentration is less than about 10 ppb.

7. A method according to claim 1, wherein said natural or synthetic rubber latex comprises less than about 100 ppb of preformed nitrosamine.

8. In a method of processing meat or poultry comprising the steps of smoking, curing or cooking meat or poultry encased in an elastic net comprising vulcanized natural or synthetic rubber latex, the improvement comprising: smoking, curing or cooking said meat or poultry encased in an elastic net comprising natural or synthetic rubber latex vulcanized with a vulcanizing system comprising at least one of zinc diisobutyldithiocarbamate and tetraisobutylthiuram disulfide which vulcanizing system functions to lower the nitrosamine content in said smoked, cured or cooked meat or poultry.

* * * * *